(12) United States Patent
Mieth et al.

(10) Patent No.: US 11,586,996 B2
(45) Date of Patent: Feb. 21, 2023

(54) METHOD AND APPARATUS FOR OPTIMIZED PRODUCTION OF SHEET-METAL PARTS

(71) Applicant: TRUMPF Werkzeugmaschinen SE + Co. KG, Ditzingen (DE)

(72) Inventors: Carina Mieth, Gerlingen (DE); Jens Ottnad, Karlsruhe (DE); Alexandru Rinciog, Dortmund (DE); Frederick Struckmeier, Heimsheim (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 0 days.

(21) Appl. No.: 17/939,986

(22) Filed: Sep. 8, 2022

(65) Prior Publication Data

US 2023/0004880 A1  Jan. 5, 2023

Related U.S. Application Data

(63) Continuation of application No. PCT/EP2021/056107, filed on Mar. 10, 2021.

(30) Foreign Application Priority Data

Mar. 13, 2020 (DE) ..................... 10 2020 203 296.3

(51) Int. Cl.
*G06Q 10/04* (2012.01)
*G05B 13/02* (2006.01)
(Continued)

(52) U.S. Cl.
CPC ........... *G06Q 10/043* (2013.01); *B21D 28/26* (2013.01); *G05B 13/027* (2013.01); *G06Q 10/0631* (2013.01); *G06Q 50/04* (2013.01)

(58) Field of Classification Search
CPC .. G06Q 10/043; G06Q 10/0631; G06Q 50/04; B21D 28/26; G05B 13/027
See application file for complete search history.

(56) References Cited

U.S. PATENT DOCUMENTS

2019/0073224 A1  3/2019  Tian
2019/0086904 A1  3/2019  Fischer

FOREIGN PATENT DOCUMENTS

EP          3485337 A1   5/2019
EP          3608743 A1   2/2020
(Continued)

OTHER PUBLICATIONS

Florian Pfitzer et al, "Event-Driven Production Rescheduling in Job Shop Environments," 2018 IEEE 14th International Conference on Automation Science and Engineering (CASE), Aug. 2018, pp. 939-944, IEEE, Munich, Germany.
(Continued)

*Primary Examiner* — Tejal Gami
(74) *Attorney, Agent, or Firm* — Leydig, Voit & Mayer, Ltd

(57) ABSTRACT

A method for optimizing production of sheet-metal parts, the production comprising cutting out and singularizing the sheet-metal parts and bending the sheet-metal parts, wherein the method includes: (A) training a neural network, which is executed on a Monte Carlo tree search framework, by means of supervised learning and self-play with reinforcement learning; (B) recording constraints for the sheet-metal parts, the constraints comprising geometric data of the sheet-metal parts; (C) creating an optimized production schedule by way of the neural network; and (D) outputting the production schedule.

15 Claims, 2 Drawing Sheets

(51) Int. Cl.
  *B21D 28/26* (2006.01)
  *G06Q 10/0631* (2023.01)
  *G06Q 50/04* (2012.01)

(56) References Cited

FOREIGN PATENT DOCUMENTS

| WO | WO 2017157809 A1 | 9/2017 |
|---|---|---|
| WO | WO 2018057978 A1 | 3/2018 |
| WO | WO 2020040763 A1 | 2/2020 |

OTHER PUBLICATIONS

C. Mieth et al, "Simulation-Based Investigation of Priority and Picking Rules for the Control of Material Flows in the Sheet Metal Industry," Simulation in Produktion und Logistik 2019: Chemnitz, Sep. 18-20, 2019, pp. 369-375, Verlag Wissenschaftliche Scripten, Auerbach, Germany.

Lingling Li et al, "An integrated approach for remanufacturing job shop scheduling with routing alternatives," Mathematical biosciences and engineering: MBE, Mar. 2019 pp. 2063-2085, 16(4), American Institute of Mathematical Sciences, Palo Alto, California, United States.

Matthieu Gondran et al, "Comparison between two approaches to solve the Job Shop Scheduling Problem with Routing," IFAC—PapersOnLine 52-13, Jan. 2019, pp. 2513-2518, Elsevier, Amsterdam, Netherlands.

Jelke J. Van Hoorn, "The Current state of bounds on benchmark instances of the job-shop scheduling problem," Journal of Scheduling volume, Oct. 2017, pp. 127-128, Springer Link, New York City, NY, United States.

Shyh-Chang Lin et al, "A Genetic Algorithm Approach to Dynamic Job Shop Scheduling Problems," ICGA, Jul. 1997, pp. 481-488, ICGA, East Lansing, MI, United States.

Takeshi Yamada et al, "Scheduling by genetic local search with multi-step crossover," 4th International Conference on Parallel Problem Solving from Nature, Sep. 1996, pp. 960-969, Springer Link, New York City, NY, United States.

Beatrice M. Ombuki et al, "Local Search Genetic Algorithms for the Job Shop Scheduling Problem," Applied Intelligence, Jul. 2004, pp. 99-109, vol. 21 ,Springer Link, New York City, NY, United States.

Simona Nicoara et al, "Simulation-based Optimization Using Genetic Algorithms for Multi-objective Flexible JSSP," Studies in Informatics and Control, Dec. 2011, pp. 333-344, vol. 20, No. 4, National Institute for Research and Development in Informatics, ICI Bucharest, Bucharest, Romania.

Leila Asadzadeh, "A Local Search Genetic Algorithm for the Job Shop Scheduling Problem with Intelligent Agents," Computers & Industrial Engineering, Apr. 2015, pp. 376-383, vol. 85, Elsevier, Amsterdam, Netherlands.

Bernd Waschneck et al, "Optimization of global production scheduling with deep reinforcement learning," Procedia CIRP, May 2018, pp. 1264-1269, vol. 72, Elsevier, Amsterdam, Netherlands.

Matthew Botvinick et al, "Reinforcement Learning, Fast and Slow," Trends in Cognitive Science, May 2019, pp. 408-422, vol. 23, No. 5, Elsevier, Amsterdam, Netherlands.

Guillaume Chaslot et al, "Monte-Carlo Tree Search: A New Framework for Game AI.," Proceedings of the Fourth Artificial Intelligence and Interactive Digital Entertainment Conference, Oct. 2008, pp. 216-217, AIIDE, Stanford, California, United States.

W. Zhang et al, "A reinforcement learning approach to job-shop scheduling," IJCAI'95: Proceedings of the 14th international joint conference on Artificial intelligence Aug. 1995, pp. 1114-1120, Morgan Kaufmann Publishers Inc., San Francisco, CA, United States.

R. S. Sutton et al., "Introduction to reinforcement learning, 4," MIT press Cambridge, 1998, pp. 1-20.

S. Mahadevan et al., "Optimizing production manufacturing using reinforcement learning," Proceedings of the Eleventh International FLAIRS Conference, May 1998, pp. 372-377; Association for the Advancement of Artificial Intelligence Construction, Menlo Park, California, United States.

S. J. Bradtke et al, "Reinforcement learning methods for continuous-time markov decision problems," Advances in neural information processing systems, 1995, pp. 393-400, MIT Press, Cambridge, Massachusetts, United States.

Simone Riedmiller et al, "A Neural Reinforcement Learning Approach to Learn Local Dispatching Policies in Production Scheduling," IJCAI '99: Proceedings of the Sixteenth International Joint Conference on Artificial Intelligence, Machine Learning, Jul. 1999, pp. 764-771, Morgan Kaufmann Publishers Inc., San Francisco, CA, United States.

Carlos D. Paternina-Arboleda et al,"A multi-agent reinforcement learning approach to obtaining dynamic control policies for stochastic lot scheduling problem," Simulation Modelling Practice and Theory, Jan. 2005, pp. 389-406, vol. 13, Elsevier, Amsterdam, Netherlands.

T. Gabel et al, "Scaling adaptive agent-based reactive job-shop 20 scheduling to large-scale problems," 2007 IEEE Symposium on Computational Intelligence in Scheduling, Apr. 2007, pp. 259-266, IEE, Honolulu, HI, USA.

Y. C. F. Reyna et al, "A reinforcement learning approach for scheduling problems," Investigación Operacional, pp. 225-231, Jan. 2015, vol. 36, No. 3, Universidad de la Habana, Havana, Cuba.

S. Qu et al, "Optimized adaptive scheduling of a manufacturing process system with multi-skill workforce and multiple machine types: An ontology-based, multi-agent reinforcement learning approach," Procedia CIRP, Dec. 2016, pp. 55-60, vol. 57, Elsevier, Amsterdam, Netherlands.

V. Mnih et al, "Playing atari with deep reinforcement learning," arXiv preprint arXiv:1312.5602, Dec. 2013, pp. 1-9, Cornell University, Ithaca, NY, United States.

A. Kuhnle et al, "Design, implementation and evaluation of reinforcement learning for an adaptive order dispatching in job shop manufacturing systems," Procedia CIRP, Jun. 2019,pp. 234-239, vol. 81, Elsevier, Amsterdam, Netherlands.

N. Stricker et al, "Reinforcement learning for adaptive order dispatching in the semiconductor industry," CIRP Annals, Manufacturing Technology, 2018, pp. 511-514, vol. 67, Issue 1, Elsevier, Amsterdam, Netherlands.

J. Schulman et al, "Trust region policy optimization," Proceedings of the 32nd International Conference on Machine Learning, Jul. 2015, pp. 1889-1897, vol. 37, JMLR.org, Norfolk, Massachusetts, United States.

M. Gombolay et al, "Apprenticeship scheduling: Learning to schedule from human experts," Proceedings of the International Joint Conference on Artificial Intelligence (IJCAI), Jun. 2016, pp. 1-9, AAAI Press / International Joint Conferences on Artificial Intelligence, Cambridge, Massachusetts, United States.

H. Ingimundardottir et al, "Supervised learning linear priority dispatch rules for job-shop scheduling," International conference on learning and intelligent optimization, Jan. 2011, pp. 263-277, Springer Link, New York City, NY, USA.

D. Silver et al, "Mastering the game of go with deep neural networks and tree search", Nature, Jan. 2016, pp. 484-503, vol. 529, No. 7587, Macmillan Publishers Limited, New York City, NY, United States.

D. Silver et al, "Mastering the game of go without human knowledge;" Nature, Oct. 2017 pp. 354 (1-42), vol. 550, No. 7676, Macmillan Publishers Limited, New York City, NY, United States.

D. Silver et al, "Mastering chess and shogi by self-play with a general reinforcement learning algorithm", arXiv preprint arXiv:1712.01815, Dec. 2017, pp. 1-19, Cornell University, Ithaca, NY, United States.

Alexandru Rinciog et al, "Sheet-Metal Production Scheduling Using AlphaGo Zero," 1st Conference on Production Systems and Logistics, Mar. 2020, pp. 1-20, pp. 1-20, Institute for Production and Logistics Research GbR Herberger & Hübner, Hannover, Germany.

Bart Verlinden et al,"Integrated sheetmetal production planning for laser cutting and bending," International Journal of Production Research, Dec. 2006, pp. 369-383, vol. 45, 2007—Issue 2, Taylor & Francis, Oxfordshire United Kingdom.

METHOD AND APPARATUS FOR OPTIMIZED PRODUCTION OF SHEET-METAL PARTS

CROSS REFERENCE TO RELATED APPLICATIONS

This application is a continuation of International Application No. PCT/EP2021/056107 (WO 2021/180816 A1), filed on Mar. 10, 2021, and claims benefit to German Patent Application No. DE 10 2020 203 296.3, filed on Mar. 13, 2020. The aforementioned applications are hereby incorporated by reference herein.

FIELD

The present disclosure relates to a method for optimizing the production of sheet-metal parts. The present disclosure furthermore relates to an apparatus for performing a method of this kind.

BACKGROUND

Sheet-metal parts occur in a wide variety of products in a wide variety of geometries. To produce products containing sheet-metal parts, the sheet-metal parts are cut from a large metal sheet, singularized, deburred, bent, joined, coated and/or assembled.

The sheet-metal parts are produced in what are known as jobs. A job includes:
i) the production of one cut-out, singularized, bent and/or assembled sheet-metal part; or
ii) the production of multiple cut-out, singularized, bent and/or assembled sheet-metal parts
by a predefined production deadline.

The individual sheet-metal parts should be cut out from the metal sheet so that as little remaining material (scrap) from the metal sheet as possible is left as waste. Since the sheet-metal parts for different jobs may have different geometries, it may be advantageous, for the purpose of scrap optimization, to provide for sheet-metal parts for different jobs together on one metal sheet to save space.

However, the resultant mingling of jobs over time increases the complexity for production scheduling. On top of this, production of the sheet-metal parts may be carried out on multiple identical or similar production machines. By way of example, there may be provision for multiple identical or similar bending machines for bending the singularized sheet-metal parts. The production machines should be operated at as high a capacity as possible.

Production scheduling, that is to say the scheduling of when which sheet-metal part is machined on which production machine, becomes very complex as a result of the variables described, in particular in the case of events such as production machine failures, urgent jobs and/or production machine capacities that are being released.

Optimum production scheduling is referred to as solving a job shop scheduling problem (JSSP). Solutions and approaches to solutions in this regard can be found in the following publications:
[1] F. Pfitzer, J. Provost, C. Mieth, and W. Liertz, "Event-driven production rescheduling in job shop environments", in 2018 IEEE 14th International Conference on Automation Science and Engineering (CASE), IEEE, 2018, pp. 939-944;
[2] M. Putz and A. Schlegel, "Simulationsbasierte Untersuchung von Prioritäts-und Kommissionierregeln zur Steuerung des Materialflusses in der Blechindustrie";
[3] L. L. Li, C. B. Li, L. Li, Y. Tang, and Q. S. Yang, "An integrated approach for remanufacturing job shop scheduling with routing alternatives.", Mathematical biosciences and engineering: MBE, vol. 16, no. 4, pp. 2063-2085, 2019;
[4] M. Gondran, M.-J. Huguet, P. Lacomme, and N. Tchernev, "Comparison between two approaches to solve the job-shop scheduling problem with routing", 2019;
[5] J. J. van Hoorn, "The current state of bounds on benchmark instances of the job-shop scheduling problem", Journal of Scheduling, vol. 21, no. 1, pp. 127-128, 2018;
[6] S.-C. Lin, E. D. Goodman, and W. F. Punch III, "A genetic algorithm approach to dynamic job shop scheduling problem", in ICGA, 1997, pp. 481-488;
[7] T. Yamada and R. Nakano, "Scheduling by genetic local search with multi-step crossover", in International Conference on Parallel Problem Solving from Nature, Springer, 1996, pp. 960-969;
[8] B. M. Ombuki and M. Ventresca, "Local search genetic algorithms for the job shop scheduling problem", Applied Intelligence, vol. 21, no. 1, pp. 99-109, 2004;
[9] E. S. Nicoara, F. G. Filip, and N. Paraschiv, "Simulation-based optimization using genetic algorithms for multi-objective flexible jssp", Studies in Informatics and Control, vol. 20, no. 4, pp. 333-344, 2011;
[10] L. Asadzadeh, "A local search genetic algorithm for the job shop scheduling problem with intelligent agents", Computers & Industrial Engineering, vol. 85, pp. 376-383, 2015;
[11] B. Waschneck, A. Reichstaller, L. Belzner, T. Altenmüller, T. Bauernhansl, A. Knapp, and Kyek, "Optimization of global production scheduling with deep reinforcement learning", Procedia CIRP, vol. 72, pp. 1264-1269, 2018;
[12] M. Botvinick, S. Ritter, J. X. Wang, Z. Kurth-Nelson, C. Blundell, and D. Hassabis, "Reinforcement learning, fast and slow", Trends in cognitive sciences, 2019.

Furthermore, WO 2017/157809 A1 has disclosed the practice of providing for production scheduling using an optimization unit and a distribution unit, which is separate therefrom.

Despite extensive efforts, the complexity of the job has meant that satisfactory production scheduling has not been able to be attained to date, however.

SUMMARY

In an embodiment, the present disclosure provides a method for optimizing production of sheet-metal parts that includes cutting out and singularizing the sheet-metal parts and bending the sheet-metal parts. The method for optimizing the production includes: (A) training a neural network, which is executed on a Monte Carlo tree search framework, by means of supervised learning and self-play with reinforcement learning; (B) recording constraints for the sheet-metal parts, the constraints comprising geometric data of the sheet-metal parts; (C) creating an optimized production schedule by way of the neural network; and (D) outputting the production schedule.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
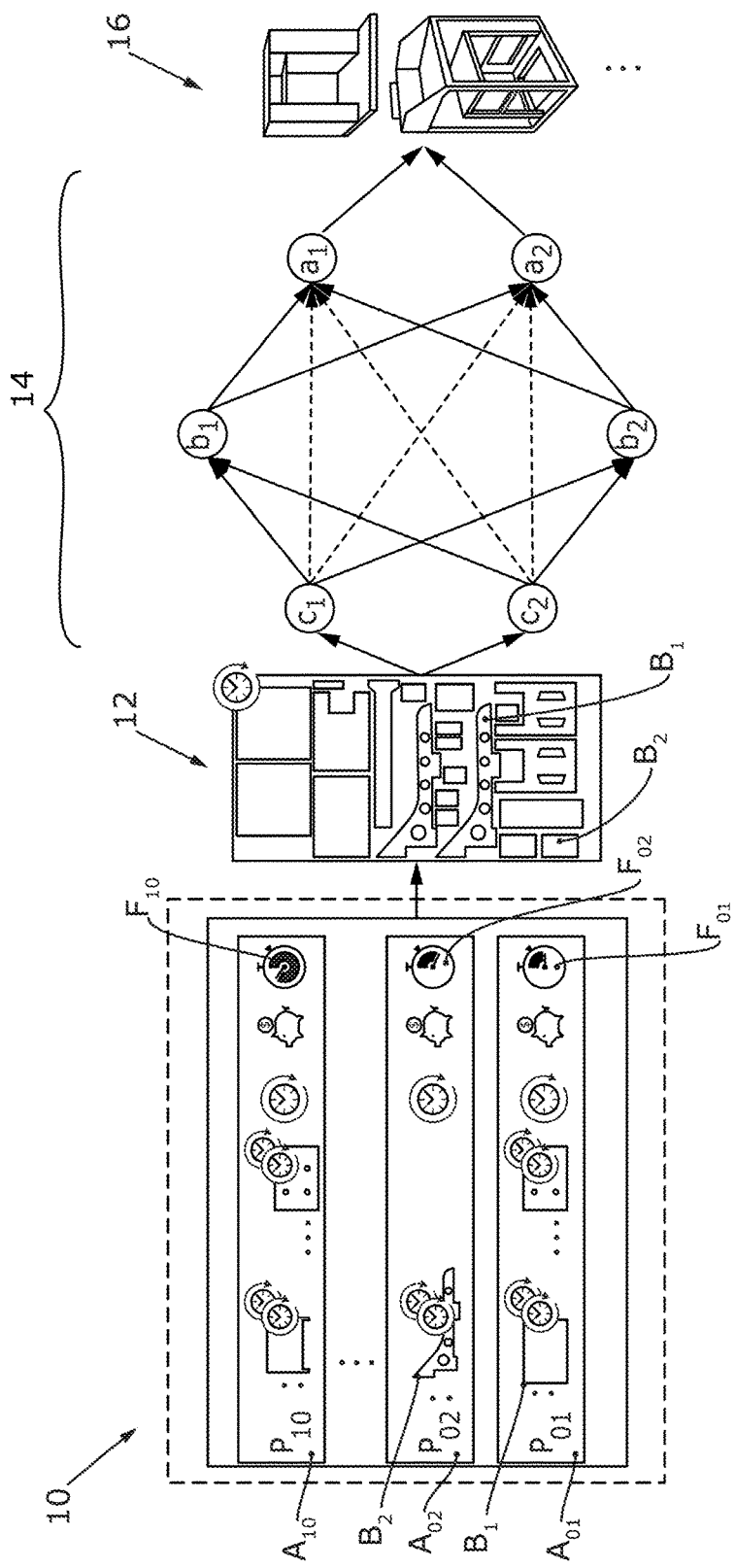
FIG. 1 schematically shows the production sequence for the manufacture of sheet-metal parts.

Aspects of the present disclosure provide a method and an apparatus for optimized production of sheet-metal parts.

An aspect of the present disclosure provides a method for optimizing the production of sheet-metal parts. The method comprises at least the following process steps (before, after and/or between the subsequent process steps there may be provision for a further process step or for multiple further process steps):

a) cutting out and singularizing the sheet-metal parts (in particular by means of punching or laser cutting);

b) bending the sheet-metal parts.

The method comprises at least the following method steps (before, after and/or between the subsequent method steps there may be provision for a further method step or for multiple further method steps):

A) training a neural network, which is executed on a Monte Carlo tree search framework, by means of supervised learning and self-play with reinforcement learning;

B) recording constraints for the sheet-metal parts, the constraints comprising at least geometric data of the sheet-metal parts;

C) creating an optimized production schedule by way of the neural network;

D) outputting the production schedule.

According to an aspect of the present disclosure, there is thus provision for providing for optimization using a neural network (NN). Neural networks are known to a person skilled in the art for example from:

[13] Günter Daniel Rey, Karl F. Wender, "Neuronale Netze", 2nd edition, 2010, Huber.

The neural network comprises decision nodes connected via edges. In the present case, these are part of a Monte Carlo tree search (MCTS) framework, that is to say an algorithm using a decision tree. This involves a promising path being selected in the decision tree (selection), the path being expanded (expansion), a simulation being performed on the basis of the expanded path (simulation) and the simulation result being taken as a basis for providing feedback, in particular in the form of strengthening or weakening, to the decision tree (backpropagation). Details regarding the implementation of an MCTS framework may be obtained from the following publication:

[14] G. Chaslot, S. Bakkes, I. Szita, and P. Spronck, "Monte-carlo tree search: A new framework for game ai", in AIIDE, 2008.

In the present case, the MCTS is performed by the neural network, the neural network receiving preliminary training by way of supervised learning. The decision-making and further training are carried out by means of self-play and reinforcement learning.

Reinforcement learning (RL) is understood to mean a feedback-based learning process that comprises in particular strengthening and weakening of the decision tree of the MCTS framework. Reinforcement learning is generally representative of a series of methods of machine learning that involve an agent independently learning a strategy in order to maximize obtained rewards. The agent is not shown beforehand which action is best in which situation, but rather receives a reward, which may also be negative, at specific times. It uses these rewards to approximate a benefit function describing what value a specific state or action has. Details regarding the implementation may be obtained from the following publications:

[15] W. Zhang and T. G. Dietterich, "A reinforcement learning approach to job-shop scheduling", in IJCAI, Citeseer, vol. 95,1995, pp. 1114-1120;

[16] R. S. Sutton, A. G. Barto, et al., Introduction to reinforcement learning, 4th MIT press Cam-bridge, 1998, vol. 2;

[17] S. Mahadevan and G. Theocharous, "Optimizing production manufacturing using reinforcement learning.", in FLAIRS Conference, 1998, pp. 372-377;

[18] S. J. Bradtke and M. O. Duff, "Reinforcement learning methods for continuous-time markov decision problems", in Advances in neural information processing systems, 1995, pp. 393-400;

[19] S. Riedmiller and M. Riedmiller, "A neural reinforcement learning approach to learn local dispatching policies in production scheduling", in IJCAI, vol. 2,1999, pp. 764-771;

[20] C. D. Paternina-Arboleda and T. K. Das, "A multi-agent reinforcement learning approach to obtaining dynamic control policies for stochastic lot scheduling problem", Simulation Modelling Practice and Theory, vol. 13, no. 5, pp. 389-406, 2005;

[21] T. Gabel and M. Riedmiller, "Scaling adaptive agent-based reactive job-shop scheduling to large-scale problems", in 2007 IEEE Symposium on Computational Intelligence in Scheduling, IEEE, 2007, pp. 259-266;

[22] Y. C. F. Reyna, Y. M. Jim'enez, J. M. B. Cabrera, and B. M. M. Hernández, "A reinforcement learning approach for scheduling problems", Investigación Operacional, vol. 36, no. 3, pp. 225-231, 2015;

[23] S. Qu, J. Wang, S. Govil, and J. O. Leckie, "Optimized adaptive scheduling of a manufacturing process system with multi-skill workforce and multiple machine types: An ontology-based, multi-agent reinforcement learning approach", Procedia CIRP, vol. 57, pp. 55-60, 2016;

[24] V. Mnih, K. Kavukcuoglu, D. Silver, A. Graves, I. Antonoglou, D. Wierstra, and M. Ried-miller, "Playing atari with deep reinforcement learning", arXiv preprint arXiv: 1312.5602, 2013;

[25] A. Kuhnle, L. Schafer, N. Stricker, and G. Lanza, "Design, implementation and evaluation of reinforcement learning for an adaptive order dispatching in job shop manufacturing systems", Procedia CIRP, vol. 81, pp. 234-239, 2019;

[26] N. Stricker, A. Kuhnle, R. Sturm, and S. Friess, "Reinforcement learning for adaptive order dispatching in the semiconductor industry", CIRP Annals, vol. 67, no. 1, pp. 511-514, 2018;

[27] J. Schulman, S. Levine, P. Abbeel, M. Jordan, and P. Moritz, "Trust region policy optimization", in International conference on machine learning, 2015, pp. 1889-1897.

Supervised learning is understood to mean training with predefined solutions. This supervised learning is generally a branch of machine learning. Learning in this case means the capability of artificial intelligence to reproduce principles. The results are known from laws of nature or expert knowledge and are used to teach the system. A learning algorithm attempts to find a hypothesis that makes the most accurate predictions possible. Hypothesis is intended to be understood here to mean a representation that assigns the presumed output value to each input value. That is to say that the method is based on an output to be learnt that is stipulated in advance and the results of which are known. The results of the learning process may be compared with the known, correct results, that is to say "supervised". Details regarding the implementation may be obtained from the following publications:

[28] M. Gombolay, R. Jensen, J. Stigile, S.-H. Son, and J. Shah, "Apprenticeship scheduling: Learning to schedule from human experts", AAAI Press/International Joint Conferences on Artificial Intelligence, 2016;

[29] H. Ingimundardottir and T. P. Runarsson, "Supervised learning linear priority dispatch rules for job-shop scheduling", in International conference on learning and intelligent optimization, Springer, 2011, pp. 263-277.

The algorithm is preferably executed in the form of a single-player game.

The combination of a Monte Carlo tree search framework based neural network and training of this neural network by means of supervised learning and self-play with reinforcement learning leads to optimization that the known optimizations in sheet-metal machining significantly outstrip.

The output in method step D) may be provided to a manufacturing execution system (MES). This allows the production schedule to be implemented directly on the production machines.

The method according an aspect of the present disclosure may comprise one or more of the following process steps in addition to those already mentioned:

c) deburring the sheet-metal parts;
d) joining, in particular welding and/or soldering, the sheet-metal parts;
e) coating the sheet-metal parts, in particular by painting and/or powder coating;
f) assembling the sheet-metal parts.

Each of these process steps may be carried out by production machines and optimized by the method according to the present disclosure.

In a preferred configuration of the present disclosure, the method is performed using the algorithm AlphaGo, in a particularly preferred configuration using the algorithm AlphaGo Zero. In this case, the algorithm comprises the above-described Monte Carlo tree search framework with the neural network trained by means of supervised learning and self-play with reinforcement learning. AlphaGo, or AlphaGo Zero, has been found within the bounds of implementation of embodiments of the present disclosure to be a very powerful algorithm for optimizing the manufacture of sheet-metal parts.

The algorithm AlphaGo Zero can be viewed on the following web pages:
tmoer.github.io/AlphaZero/
towardsdatascience.com/alphazero-implementation-and-tutorial-f4324d65fdfc
medium. com/applied-data-science/how-to-build-your-own-alphazero-ai-using-python-and-keras-7f664945c188

AlphaGo, or AlphaGo Zero, is preferably implemented in Python and/or Tensorflow. Further details regarding the implementation of AlphaGo, or AlphaGo Zero, may be obtained from the following publications:

[30] D. Silver, A. Huang, C. J. Maddison, A. Guez, L. Sifre, G. Van Den Driessche, J. Schrittwieser, I. Antonoglou, V. Panneershelvam, M. Lanctot, et al., "Mastering the game of go with deep neural networks and tree search", nature, vol. 529, no. 7587, p. 484, 2016.

[31] G. Chaslot, S. Bakkes, I. Szita, and P. Spronck, "Monte-carlo tree search: A new framework for game ai.", in AIDE, 2008.

[32] D. Silver, J. Schrittwieser, K. Simonyan, I. Antonoglou, A. Huang, A. Guez, T. Hubert, L. Baker, M. Lai, A. Bolton, et al., "Mastering the game of go without human knowledge", Nature, vol. 550, no. 7676, p. 354, 2017.

[33] D. Silver, T. Hubert, J. Schrittwieser, I. Antonoglou, M. Lai, A. Guez, M. Lanctot, L. Sifre, D. Kumaran, T. Graepel, et al., "Mastering chess and shogi by self-play with a general reinforcement learning algorithm", arXiv preprint arXiv: 1712.01815, 2017.

The full scope of the disclosure of all of the publications and websites cited here is included (incorporated by reference) in the present description.

More preferably, the training in method step A) is performed using heuristically ascertained solutions from optimized production schedules. This provides the neural network with a good starting point for its further optimization.

In particular, optimized production schedules in the form of earliest due date (EDD) solutions may be used. These solutions have been found to be particularly advantageous because urgent jobs that render the previous production scheduling obsolete often arise in practice.

A particularly preferred configuration of the method relates to the case in which the optimization comprises both scrap minimization and production time optimization. This allows manufacture that is both fast and inexpensive and saves resources. Aims of production time optimization are in particular minimal total delay and/or minimal total production time.

The constraints in method step B) may comprise the production deadlines for the sheet-metal parts. Production time optimization may then take account of the meeting of production deadlines. The meeting of production deadlines may be given higher priority than other aims.

Alternatively or additionally, the constraints in method step B) may comprise the values, that is to say the monetary values, or prices, of the sheet-metal parts. This allows production to be optimized on the basis of the values of the respective sheet-metal parts. In general, this allows the value of a sheet-metal part, for example the price of its delayed manufacture, to be qualified within the bounds of the optimization according to aspects of the present disclosure.

More preferably, the scrap is assigned a scrap score and the meeting of the production deadline is assigned a production deadline score, which is based on the value of the sheet-metal parts, the optimization minimizing both the scrap score and the production deadline score. Assignment of the scores allows production time minimization to be handled, or optimized, on the same scale as scrap minimization.

In this case, the estimated maximum achievable total score value is preferably stored in the decision node; the probability (=weighting) of the respective decision of the decision node being the best is preferably stored on the edges connecting the decision nodes.

The scrap score and the production deadline score may be used in the form of a price, for example. The price for scrap material may then be offset against the price of a sheet-metal part that is produced too late.

The method allows optimization based on the following function:

$$r_{abs} := -c(W) + \sum_{i=1}^{10} v_i - \lambda \max\{0, T_i\}$$

where c(W) is the value for the total material used (including scrap, that is to say waste), $T_i$ and $v_i$ are the delay and the value of job part i, respectively. $\lambda$ is a parameter that penalizes delay. $r_{abs}$ reflects the sum of the sheet-metal parts, in each case reduced in proportion to production deadlines, minus total material costs. The formula may be used to generate a reward of the neural network, in particular scaled to [0, 1], the maximum possible score being $r_{max}$ (without delay and without scrap).

Method steps B) to D) may be triggered as needed by the occurrence of an event, the event being read in via an event interface.

The event is preferably in the form of a request for further machining of a sheet-metal part, in the form of production machine capacity that is being released, in the form of a production machine failure and/or in the form of an urgent job.

The event may be triggered and read in via the event interface in an automated manner. Particularly preferably, the event is triggered and read in via the event interface by a production machine, an indoor localization system and/or a manufacturing execution system. In the case of an indoor localization system, the scheduling may be optimized further in an automated manner by events transmitted by the tags of the indoor localization system.

To improve the neural network further, a method step E) may involve a user rating of the production schedule that is output in method step D) being read in.

Aspects of the present disclosure furthermore relate to a method for producing sheet-metal parts, wherein a method as mentioned above is performed and then process steps a) and b) are performed on the basis of the optimized production schedule.

The method for producing sheet-metal parts may involve process steps c), d), e) and/or f) being performed on the basis of the optimized production schedule after process steps a) and b).

An aspect of the present disclosure provides an apparatus for performing a method as described here, wherein the apparatus comprises a computer for storing and executing the neural network, a constraint interface for reading in the constraints and a production schedule interface for outputting the production schedule.

There may be provision for a user rating interface for reading in the user ratings. The neural network may be in cloud-based form in order to facilitate training with, in particular anonymized, user ratings.

The apparatus according to an aspect of the present disclosure may comprise the event interface and furthermore a production machine, an indoor localization system (with multiple tags that transmit events) and/or a manufacturing execution system, an event triggered by the production machine, the indoor localization system and/or the manufacturing execution system being able to be read in via the event interface. The apparatus may be optimized in an automated manner, or in a semi-automated manner, in this case.

Further advantages of the present disclosure will become apparent from the description and the drawing. Likewise, the features mentioned above and those that will be explained still further can be used in each case individually by themselves or as a plurality in any desired combinations. The embodiments shown and described should not be understood as an exhaustive enumeration, but rather are of illustrative character for outlining the invention.

FIG. 1 schematically shows the manufacture of various jobs. FIG. 1 shows the jobs $A_{01}$ to $A_{10}$ by way of example. The jobs $A_{01}$-$A_{10}$ comprise the production of products $P_{01}$ to $P_{10}$, which are manufactured from multiple, in particular different, sheet-metal parts using their respective geometric data. For reasons of clarity, only the sheet-metal parts $B_1$ and $B_2$ are provided with a reference sign in FIG. 1.

As indicated by clock symbols in FIG. 1, the individual sheet-metal parts $B_1$, $B_2$ have different manufacturing times. Furthermore, the jobs $A_{01}$ to $A_{10}$ have different production deadlines $F_{01}$ to $F_{10}$. Piggy banks indicate that the sheet-metal parts $B_1$, $B_2$ have different (monetary) values. The provisions described are constraints 10 for the sheet-metal parts $B_1$, $B_2$.

The sheet-metal parts $B_1$, $B_2$ are arranged on a metal sheet 12 so that, as far as possible, the scrap is minimal. As may be seen from FIG. 1, this may lead to sheet-metal parts $B_1$, $B_2$ for different jobs $A_{01}$-$A_{10}$ mingling. The sheet-metal parts $B_1$, $B_2$ are machined on production machines 14, of which FIG. 1 shows production machines $c_1$, $c_2$ (cut) for cutting and singularizing, production machines $b_1$, $b_2$ (bend) for bending and production machines $a_1$, $a_2$ (assemble) for assembling the sheet-metal parts $B_1$, $B_2$. In addition, there may be provision for further production machines 14, for machining the sheet-metal parts $B_1$, $B_2$, for example for deburring, joining and/or coating the sheet-metal parts $B_1$, $B_2$. The finished products comprising the sheet-metal parts $B_1$, $B_2$ are shown in FIG. 1 at reference sign 16.

The splitting of the sheet-metal parts $B_1$, $B_2$ over the production machines 14 is a highly complex problem given the different constraints 10 for the sheet-metal parts $B_1$, $B_2$. This is particularly because the individual process steps may take different lengths of time, production machines 14 may fail and/or urgent jobs may arrive.

Figure 2:
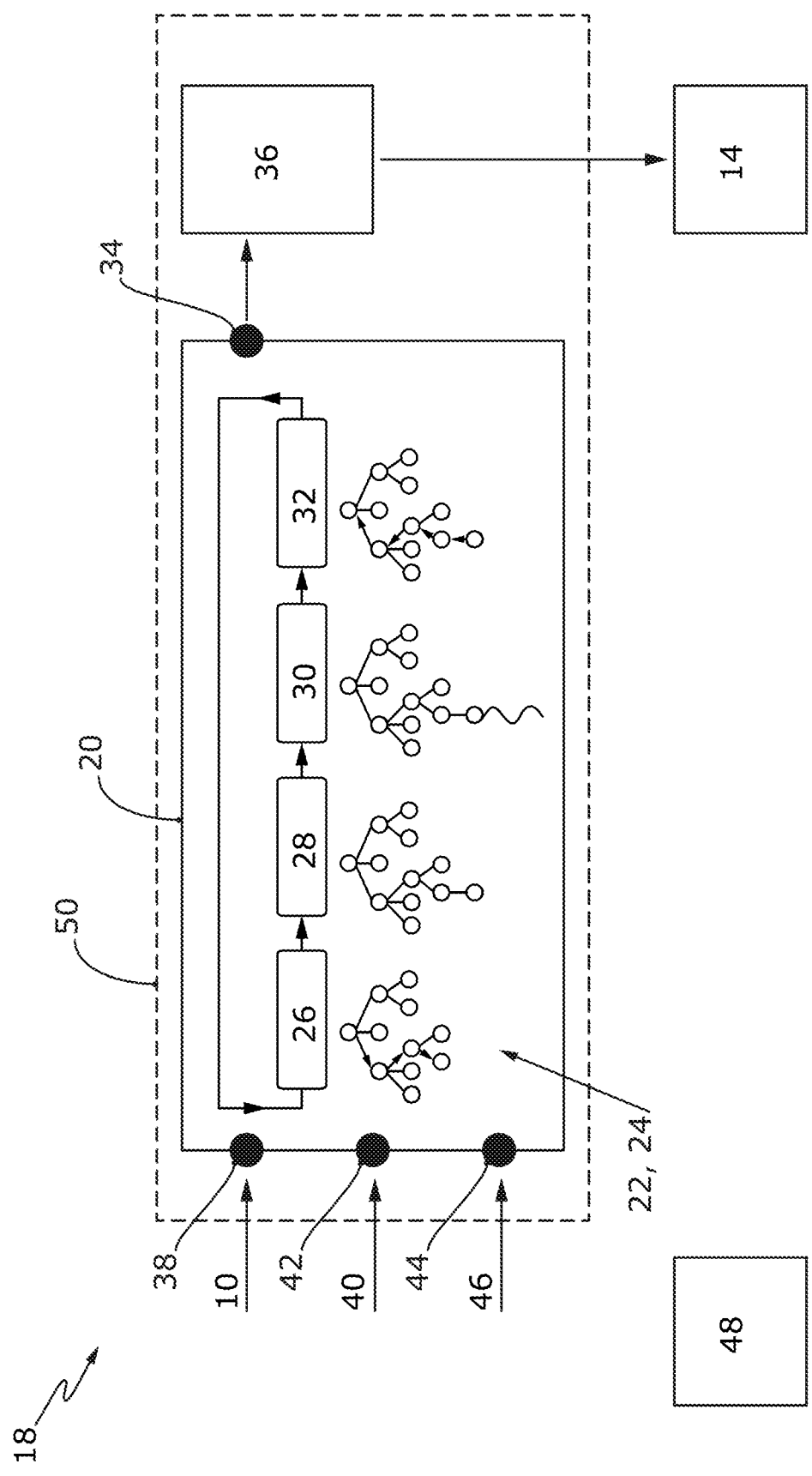
FIG. 2 schematically shows the optimization of the production sequence.

The optimization of the production sequence according to an aspect of the present disclosure is shown in FIG. 2. FIG. 2 shows an apparatus 18 for optimized manufacture, or optimized manufacture scheduling, of the sheet-metal parts $B_1$, $B_2$ from FIG. 1. There is provision for an algorithm 20 for this. The algorithm 20 is preferably available as AlphaGo or AlphaGo Zero. The algorithm 20 comprises a Monte Carlo tree search framework 22. The Monte Carlo tree search framework 22 is modified by a neural network 24. This involves first performing supervised learning, that is to say training on the basis of heuristically ascertained problem solutions.

Self-play with reinforcement learning is then carried out as a single-player game. This is shown in FIG. 2 in steps 26 (selection), 28 (expansion), 30 (simulation) and 32 (backpropagation). This involves a decision path via specific decision nodes being selected in step 26, the decision tree being expanded with the decision nodes on the basis of the random principle in step 28, the result therefrom being simulated in step 30 and the decision nodes being re-weighted (strengthened or weakened) on the basis of this simulation result in step 32. Steps 26 to 32 are repeated multiple times.

The thus performed ascertaining of as optimum a split for the manufacturing steps as possible is preferably carried out both in view of scrap minimization (nesting) and in view of production time optimization (scheduling). This procedure may be described as optimization by way of a nesting agent and a scheduling agent, wherein the agents take decisions in a simulation environment and, depending on the quality of the decision, obtain a reward therefor. The simulation is a reflection of the sheet-metal manufacture.

The optimized production schedule is output via a production schedule interface 34, in particular to a manufacturing execution system 36. The manufacturing execution system 36 controls the production machines 14, that is to say the actual sheet-metal manufacture, using the optimized production schedule.

The algorithm 20 is supplied with the constraints 10 via a constraint interface 38. User ratings 40 may be supplied to the algorithm 20 via a user rating interface 42.

Alternatively or additionally, there may be provision for an event interface 44, via which an event 46 can be read in. The event 46 may be triggered by the manufacturing execution system 36, one or more production machines 14 and/or an indoor localization system 48. The event 46 may comprise for example a failure of a production machine 14, capacity that is being released for a production machine 14, errors during production, new jobs and/or job amendments. In particular, the event 46 comprises the further production scheduling for a sheet-metal part $B_1$, $B_2$ (see FIG. 1) that has just completed a production step in a production machine 14.

The algorithm 20 is executed on a computer 50. The computer 50 may be in cloud-based form in order to facilitate the use of user ratings 40 from different users. The manufacturing execution system 36 may (as indicated) be executed on the same computer or a different computer.

Combining all of the figures of the drawing, aspects of the present disclosure relate to a method for optimizing manufacture of sheet-metal parts $B_1$, $B_2$. The method optimizes the assignment of sheet-metal parts $B_1$, $B_2$ for machining on different production machines 14 and outputs an optimized production schedule. To this end, there is provision for an algorithm 20 that comprises a decision tree in the form of a Monte Carlo tree search framework 22 and a neural network 24. The algorithm 20 is trained with every new query by way of self-play and reinforcement learning. Preliminary training of the algorithm 20 is achieved by way of supervised learning. The algorithm 20 preferably optimizes the production schedule primarily in respect of minimally delayed production deadlines $F_{01}$ to $F_{10}$ for the sheet-metal parts $B_1$, $B_2$ and secondarily in respect of minimal scrap. The allocation of scores allows both aims to be rated together. The method may comprise receiving query-triggering events 46 and/or operating production machines 14 in accordance with the production schedule. The present disclosure furthermore relates to an apparatus 18 for performing the method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS $A_{01}$ to $A_{10}$ Jobs
$P_{01}$ to $P_{10}$ Products
$B_1$, $B_2$ Sheet-metal parts
$F_{01}$ to $F_{10}$ Production deadlines
$c_1$, $c_2$ Cutting production machines
$b_1$, $b_2$ Bending production machines
$a_1$, $a_2$ Assembly production machines
10 Constraints
12 Metal sheet
14 Production machines
16 Products
18 Apparatus
20 Algorithm
22 Monte Carlo tree search framework
24 Neural network
26 Step—selection
28 Step—expansion
30 Step—simulation
32 Step—backpropagation
34 Production schedule interface
36 Manufacturing execution system
38 Constraint interface
40 User ratings
42 User rating interface
44 Event interface
46 Event
48 Indoor localization system
50 Computer

The invention claimed is:

1. A method for optimizing production of sheet-metal parts, the production comprising cutting out and singularizing the sheet-metal parts and bending the sheet-metal parts, the method comprising: A) training a neural network, which is executed on a Monte Carlo tree search framework, using supervised learning and self-play with reinforcement learning;
B) recording constraints for the sheet-metal parts, the constraints comprising geometric data of the sheet-metal parts;
C) creating an optimized production schedule by way of the neural network; and
D) outputting the production schedule.

2. The method as claimed in claim 1, wherein the production of the sheet-metal parts further comprises:
deburring the sheet-metal parts;
joining the sheet-metal parts;
coating the sheet-metal parts; and
assembling the sheet-metal parts.

3. The method as claimed in claim 1, wherein the method steps A) to D) are performed using an algorithm based on AlphaGo or AlphaGo Zero and the algorithm comprises the neural network.

4. The method as claimed in claim 1, wherein the training in the method step A) is performed using heuristically ascertained solutions from optimized production schedules.

5. The method as claimed in claim 4, wherein the optimized production schedules comprise earliest due date solutions.

6. The method as claimed in claim 1, wherein the optimization comprises both minimization of scrap and optimization of production time.

7. The method as claimed in claim 6, wherein the constraints in the method step B) additionally comprise production deadlines for the sheet-metal parts.

8. The method as claimed in claim 7, wherein the constraints in the method step B) additionally comprise the values of the sheet-metal parts.

9. The method as claimed in claim 8, further comprising assigning a scrap score to the scrap and meeting the production deadline is assigned a production deadline score, wherein the scrap score is based on the value of the sheet-metal parts, the optimization minimizing both the scrap score and the production deadline score.

10. The method as claimed in claim 1, wherein the method steps B) to D) are performed on an event-triggered basis, the event being read in via an event interface.

11. The method as claimed in claim 10, wherein the event is in the form of a request for further machining of a sheet-metal part, in the form of production machine capacity that is being released, in the form of a production machine failure and/or in the form of an urgent job.

12. The method as claimed in claim 10, wherein the event is triggered and read in via the event interface by a production machine, an indoor localization system and/or a manufacturing execution system.

13. The method as claimed in claim 1, the method further comprising a method step E), which comprises a user rating of the production schedule that is output in method step D) being read in and the neural network being trained further with the user rating.

14. An apparatus for performing the method as claimed in claim 1, wherein the apparatus comprises a computer for storing and executing the neural network, a constraint interface for reading in the constraints and a production schedule interface for outputting the production schedule.

15. The apparatus as claimed in claim 14, further comprising an event interface, a production machine, an indoor localization system and/or a manufacturing execution system, an event triggered by the production machine, the indoor localization system and/or the manufacturing execution system being able to be read in via the event interface.

* * * * *